(12) United States Patent
Ding et al.

(10) Patent No.: US 12,263,600 B2
(45) Date of Patent: Apr. 1, 2025

(54) CALIBRATION METHOD AND APPARATUS FOR INDUSTRIAL ROBOT, THREE-DIMENSIONAL ENVIRONMENT MODELING METHOD AND DEVICE FOR INDUSTRIAL ROBOT, COMPUTER STORAGE MEDIUM, AND INDUSTRIAL ROBOT OPERATING PLATFORM

(71) Applicant: Robert Bosch GmbH, Stuttgart (DE)

(72) Inventors: Wan Ding, Shanghai (CN); Liupeng Yan, Shanghai (CN); William Wang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 17/753,518

(22) PCT Filed: Sep. 6, 2019

(86) PCT No.: PCT/CN2019/104732
§ 371 (c)(1),
(2) Date: Mar. 4, 2022

(87) PCT Pub. No.: WO2021/042376
PCT Pub. Date: Mar. 11, 2021

(65) Prior Publication Data
US 2022/0331969 A1 Oct. 20, 2022

(51) Int. Cl.
*B25J 9/16* (2006.01)
*G01B 11/03* (2006.01)
*G06T 17/05* (2011.01)

(52) U.S. Cl.
CPC .......... *B25J 9/1692* (2013.01); *B25J 9/1605* (2013.01); *G01B 11/03* (2013.01); *G06T 17/05* (2013.01); *G06T 2207/10024* (2013.01)

(58) Field of Classification Search
CPC ....... B25J 9/1692; B25J 9/1605; G01B 11/03; G06T 17/05; G06T 2207/10024;
(Continued)

(56) References Cited

U.S. PATENT DOCUMENTS 10,556,336 B1 * 2/2020 Bai .................. B25J 9/1671
2018/0126553 A1 * 5/2018 Corkum ............ B25J 9/1697
(Continued)

FOREIGN PATENT DOCUMENTS

| CN | 101231749 A | 7/2008 |
|---|---|---|
| CN | 107243897 A | 10/2017 |

(Continued)

OTHER PUBLICATIONS

International Search Report corresponding to Interational Patent Application No. PCT/CN2019/104732, mailed May 11, 2020 (7 pages).

*Primary Examiner* — Sohana Tanju Khayer
(74) *Attorney, Agent, or Firm* — Maginot, Moore & Beck LLP

(57) ABSTRACT

A calibration method for an industrial robot includes receiving a first model of the industrial robot, the first model is synchronized with a pose state of the industrial robot located at a specific position in an actual environment; receiving an environment model around the industrial robot, the environment model including a second model of the industrial robot; obtaining registration information of the second model, at least by selecting at least three corresponding non-collinear point pairs in the first model and the second model to perform registration; and based on the registration information, calibrating a coordinate system of the environment model to a base coordinate system of the industrial robot.

19 Claims, 5 Drawing Sheets

(58) Field of Classification Search
CPC . G06T 2207/10116; G06T 2207/10152; G06T 2207/20081; G06T 2207/30128; G06T 7/0006

See application file for complete search history.

(56) References Cited

U.S. PATENT DOCUMENTS

| | | |
|---|---|---|
| 2018/0222056 A1 | 8/2018 | Suzuki et al. |
| 2018/0311825 A1* | 11/2018 | Yamamoto ............. B25J 9/1656 |
| 2019/0193268 A1* | 6/2019 | Tsou ...................... B25J 9/1605 |
| 2019/0351548 A1* | 11/2019 | Morey .................. B25J 19/007 |
| 2020/0101599 A1* | 4/2020 | Yoshida ................ B25J 9/1697 |
| 2020/0394410 A1* | 12/2020 | Zhang .................. G01C 21/206 |
| 2021/0213973 A1* | 7/2021 | Carillo Pe?a et al. . G06N 3/044 |
| 2022/0193911 A1* | 6/2022 | Floyd-Jones .......... B25J 9/1664 |

FOREIGN PATENT DOCUMENTS

| | | |
|---|---|---|
| CN | 107650144 A | 2/2018 |
| CN | 107727026 A | 2/2018 |
| CN | 108161931 A | 6/2018 |
| JP | 2018-34272 A | 3/2018 |
| WO | 2019/049947 A1 | 3/2019 |

\* cited by examiner

CALIBRATION METHOD AND APPARATUS FOR INDUSTRIAL ROBOT, THREE-DIMENSIONAL ENVIRONMENT MODELING METHOD AND DEVICE FOR INDUSTRIAL ROBOT, COMPUTER STORAGE MEDIUM, AND INDUSTRIAL ROBOT OPERATING PLATFORM

This application is a 35 U.S.C. § 371 National Stage Application of PCT/CN2019/104732, filed on Sep. 6, 2019, the disclosure of which is incorporated herein by reference in its entirety.

The disclosure relates to a calibration method and apparatus and a three-dimensional environment modeling method and device for an industrial robot, a computer storage medium and an industrial robot operating platform.

BACKGROUND

In certain specific industrial application scenarios, it is necessary for an industrial robot to plan the optimal trajectory during each cycle time. At this time, the robot needs to first of all know its surrounding environment in order to plan a collision-free trajectory.

One way of enabling the robot to understand its surrounding environment is to construct an environment model thereof. In the process of constructing the environment model thereof, the coordinate system of the environment reconstruction model needs to be calibrated to the robot base coordinate system.

Currently, the coordinate system of the environment reconstruction model is usually calibrated to the robot base coordinate system by the hand-eye calibration method. For example, there are two forms of hand-eye calibration: in one, a camera and an extremity of the robot are fixed together, and this is called "eye in hand"; in the other, the camera is fixed to a base outside the robot, and this is called "eye to hand". It can be seen that these two forms are distinguished from one another according to the fixing positions of the camera and the robot. However, the hand-eye calibration method requires the camera to be fixed on the robot, so its flexibility is poor. In the prior art, an environment reconstruction model can also be obtained using a camera motion capture system, but this requires complicated hardware settings and is very expensive.

Therefore, an improved calibration scheme for industrial robots and a three-dimensional environment modeling scheme are desired.

SUMMARY

A solution of the disclosure proposes a calibration method for an industrial robot, the method comprising: receiving a first model of the industrial robot, wherein the first model is synchronized with a pose state of the industrial robot located at a specific position in an actual environment; receiving an environment model around the industrial robot, the environment model comprising a second model of the industrial robot; obtaining registration information of the second model, at least by selecting at least three corresponding non-collinear point pairs in the first model and the second model to perform registration; and based on the registration information, calibrating a coordinate system of the environment model to a base coordinate system of the industrial robot.

By using the calibration method described above, it is possible to obtain an environment model with a highly accurate calibration result, without the need to perform coordinate system calibration by a hand-eye calibration method with poor flexibility, and hardware settings are also simpler.

Preferably, in the calibration method described above, the step of obtaining registration information of the second model, at least by selecting at least three corresponding non-collinear point pairs in the first model and the second model to perform registration, comprises: selecting four corresponding non-collinear point pairs in the first model and the second model to perform first registration; and using an iterative closest point (ICP) method to perform second registration of the first model and the second model, so as to obtain registration information of the second model.

Using the "secondary registration" scheme described above, the environment model that is finally constructed has a high level of precision, and human error is reduced or avoided.

Preferably, in the calibration method described above, the environment model around the industrial robot is acquired by the following steps: using a handheld RGB-D camera to acquire color and depth information of a surrounding environment of the industrial robot, and based on the color and depth information, performing three-dimensional modeling of the surrounding environment of the industrial robot, so as to obtain the environment model. In other words, the environment model can be obtained after collecting information with a handheld camera. This is more flexible than the "hand-eye calibration" method in which the camera is fixed on the robot.

Another solution of the disclosure provides a three-dimensional environment modeling method for an industrial robot, the method comprising: based on color and depth information of a surrounding environment of the industrial robot, performing three-dimensional modeling of the surrounding environment of the industrial robot, so as to obtain an environment model; calibrating a coordinate system of the environment model to a base coordinate system of the industrial robot; and obtaining a workbench model of the industrial robot, at least by performing grid cropping and filling of the calibrated environment model, wherein the step of calibrating a coordinate system of the environment model to a base coordinate system of the industrial robot comprises: receiving a first model of the industrial robot, wherein the first model is synchronized with a pose state of the industrial robot located at a specific position in an actual environment; receiving the environment model, the environment model comprising a second model of the industrial robot; obtaining registration information of the second model, at least by selecting at least three corresponding non-collinear point pairs in the first model and the second model to perform registration; and based on the registration information, calibrating a coordinate system of the environment model to a base coordinate system of the industrial robot.

The 3D environment modeling method described above is faster and more efficient than the existing modeling solution based on 3D geometric measurement, and does not require manual modeling and measurement of the size and position of each object. Moreover, the technical solution provides a standardized configuration method for all workbench objects (without the need for excessive manual intervention and design skills), so as to obtain the final three-dimensional workbench model.

Preferably, in the three-dimensional environment modeling method described above, the color and depth information is acquired by means of a handheld RGB-D camera.

Preferably, the three-dimensional environment modeling method described above may further comprise: after the coordinate system of the environment model is calibrated to the base coordinate system of the industrial robot, cropping the calibrated environment model according to a working space range of the industrial robot. The coordinate system of the environment model may be random before calibration.

For example, the coordinate system of the environment model can be calibrated to the robot base coordinate system by using an iterative closest point method (such as Generalized ICP) that is conventional in the art. When cropping is performed, the calibrated environment model can be cropped according to the industrial robot's working space range. "Cropping" can consist of the following: based on a pre-defined working range of the industrial robot and calibrated robot coordinate system information, the environment model within the robot's working space range is segmented out, and at the same time the reconstructed robot model is removed according to the size range of the robot, to obtain an environment model in the robot's working space range that does not contain the robot model.

Preferably, the three-dimensional environment modeling method described above may further comprise: after the coordinate system of the environment model is calibrated to the base coordinate system of the industrial robot, using a grid degree-of-integration evaluation method to measure whether mapping of the calibrated environment model is complete.

Preferably, the three-dimensional environment modeling method described above may further comprise: after a grid degree-of-integration evaluation method is used to measure whether mapping of the calibrated environment model is complete, evaluating the accuracy of the calibrated environment model.

Preferably, in the three-dimensional environment modeling method described above, the grid cropping and filling comprises: selecting an incomplete plane to be reconstructed; using the method of least squares to obtain a parameter fitting the plane, according to a vertex on the plane; and establishing a new triangular face to replace the incomplete plane according to the parameter.

Preferably, in the three-dimensional environment modeling method described above, the grid cropping and filling comprises: adding a robot working space boundary model to the calibrated environment model.

Preferably, in the three-dimensional environment modeling method described above, the grid cropping and filling comprises: according to a set boundary threshold, sequentially selecting holes smaller than the boundary threshold; and based on a rate of change and information relating to curvature around a boundary of the selected hole, determining a curvature of a triangular face used to fill the hole.

Preferably, in the three-dimensional environment modeling method described above, the step of obtaining a workbench model of the industrial robot, at least by performing grid cropping and filling of the calibrated environment model, comprises: performing a grid simplification process after performing grid cropping and filling of the calibrated environment model; and after the grid simplification process, obtaining a workbench model of the industrial robot.

Preferably, in the three-dimensional environment modeling method described above, the grid simplification process comprises: determining a target number of faces or a target optimization percentage; and using an extraction algorithm to obtain the determined number of faces.

Preferably, the three-dimensional environment modeling method described above may further comprise: obtaining a model of a new object when the surrounding environment of the industrial robot changes; adding the model of the new object to the workbench model on the basis of an iterative closest point method.

Another solution of the disclosure provides a calibration apparatus for an industrial robot, the apparatus comprising: a first receiving unit, configured to receive a first model of the industrial robot, wherein the first model is synchronized with a pose state of the industrial robot located at a specific position in an actual environment; a second receiving unit, configured to receive an environment model around the industrial robot, the environment model comprising a second model of the industrial robot; a registration unit, configured to obtain registration information of the second model, at least by selecting at least three corresponding non-collinear point pairs in the first model and the second model to perform registration; and a calibration unit, configured to calibrate a coordinate system of the environment model to a base coordinate system of the industrial robot on the basis of the registration information.

Preferably, in the calibration apparatus described above, the registration unit comprises: a first registration unit, configured to select four corresponding non-collinear point pairs in the first model and the second model to perform first registration; and a second registration unit, configured to perform second registration of the first model and the second model using an iterative closest point method, so as to obtain registration information of the second model.

Another solution of the disclosure provides a three-dimensional environment modeling device for an industrial robot, the device comprising: a first acquisition apparatus, configured to perform three-dimensional modeling of a surrounding environment of the industrial robot, based on color and depth information of the surrounding environment of the industrial robot, so as to obtain an environment model; a calibration apparatus, configured to calibrate a coordinate system of the environment model to a base coordinate system of the industrial robot; and a second acquisition apparatus, configured to obtain a workbench model of the industrial robot at least by performing grid cropping and filling of the calibrated environment model, wherein the calibration apparatus comprises:
  a first receiving unit, configured to receive a first model of the industrial robot, wherein the first model is synchronized with a pose state of the industrial robot located at a specific position in an actual environment; a second receiving unit, configured to receive the environment model, the environment model comprising a second model of the industrial robot; a registration unit, configured to obtain registration information of the second model, at least by selecting at least three corresponding non-collinear point pairs in the first model and the second model to perform registration; and a calibration unit, configured to calibrate a coordinate system of the environment model to a base coordinate system of the industrial robot on the basis of the registration information.

Preferably, in the three-dimensional environment modeling device described above, the color and depth information is acquired by means of a handheld RGB-D camera.

Preferably, the three-dimensional environment modeling device described above may further comprise: a third acquisition apparatus, configured to obtain a model of a new object when the surrounding environment of the industrial robot changes; an adding/deleting apparatus, configured to add the model of the new object to the workbench model on the basis of an iterative closest point method. The adding/deleting apparatus can use principles and methods similar to those in the aforementioned robot calibration scheme. Specifically, the adding/deleting apparatus may be configured to select at least three non-collinear point pairs which correspond between the new object model and the workbench model, to perform rough registration. The adding/deleting apparatus then performs fine registration by a method based on closest point iteration, and finally adds the model of the new object to the workbench model.

Another solution of the disclosure provides a computer storage medium, comprising instructions which, when run, execute the calibration method described above or the three-dimensional environment modeling method as described above.

Another solution of the disclosure provides an industrial robot operating platform, comprising the calibration apparatus described above or the three-dimensional environment modeling device described above.

BRIEF DESCRIPTION OF THE DRAWINGS

With reference to the drawings, the content disclosed in the disclosure will become easier to understand. It is easy for those skilled in the art to understand that these drawings are only for illustrative purposes, and are not intended to limit the scope of protection of the disclosure. In the drawings.

DETAILED DESCRIPTION

The following explanation describes specific embodiments of the disclosure to teach those skilled in the art how to make and use the best mode of the disclosure. In order to teach the principles of the disclosure, some conventional aspects have been simplified or omitted. Those skilled in the art should understand that variations derived from these embodiments will fall within the scope of the disclosure. Those skilled in the art should understand that the following features can be combined in various ways to form many variations of the disclosure. Therefore, the disclosure is not limited to the following specific embodiments, and is defined only by the claims and their equivalents.

Figure 1:
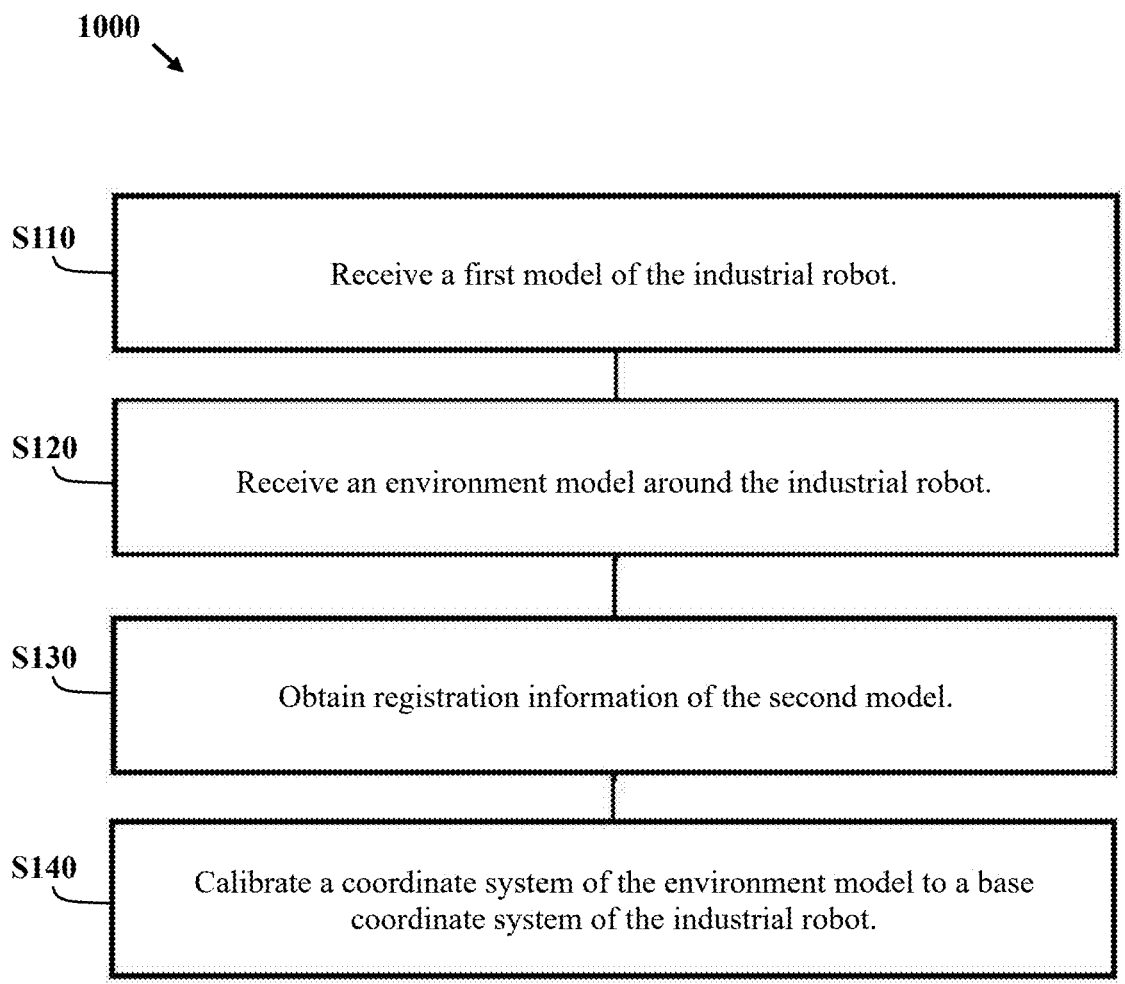
FIG. 1 shows a calibration method for an industrial robot according to an embodiment of the disclosure.

Referring to FIG. 1, FIG. 1 shows a calibration method 1000 for an industrial robot according to an embodiment of the disclosure.

In step S110, a first model of the industrial robot is received, wherein the first model is synchronized with a pose state of the industrial robot located at a specific position in an actual environment.

In step S120, an environment model around the industrial robot is received, the environment model comprising a second model of the industrial robot.

In step S130, registration information of the second model is obtained, at least by selecting at least three corresponding non-collinear point pairs in the first model and the second model to perform registration.

In step S140, based on the registration information, a coordinate system of the environment model is calibrated to a base coordinate system of the industrial robot.

By using the above-mentioned calibration method 1000, it is possible to obtain an environment model with high accuracy without the need to perform coordinate system calibration by a hand-eye calibration method with poor flexibility, and the hardware settings are also simpler.

In one embodiment, step S130 comprises: selecting four corresponding non-collinear point pairs in the first model and the second model to perform first registration; and using an iterative closest point method to perform second registration of the first model and the second model, thereby obtaining registration information of the second model. Using the "secondary registration" scheme described above, the environment model that is finally constructed has a high level of precision, and human error is reduced or avoided.

In addition, those skilled in the art will understand that the greater the number of corresponding point pairs selected (>=3), the better the result in terms of registration between models.

In one embodiment, in step S130, four corresponding non-collinear point pairs in the first model and the second model are randomly selected to perform registration. In another embodiment, points in a robot reconstruction model that have prominent textural or geometric features and are easily made to correspond to corresponding positions of a robot 3D model are selected, such as the vertices of a cuboid.

In one embodiment, a handheld RGB-D color depth camera can be used to acquire color and depth information of a surrounding environment of the industrial robot, and three-dimensional modeling of the surrounding environment of the industrial robot can be performed on the basis of the color and depth information, so as to obtain the environment model. In other words, the environment model can be obtained after collecting information with a handheld camera. This is more flexible than the "hand-eye calibration" method in which the camera is fixed on the robot.

Therefore, compared with the existing calibration methods, the calibration method 1000 described above has the following advantages: firstly, the environment reconstruction model can be directly obtained by means of a handheld camera; secondly, no complicated hardware settings and hand-eye calibration are required; thirdly, the method has high accuracy and reduces or avoids human error; finally, objects can be quickly added or removed from the environment model.

In one embodiment, the calibration method for an industrial robot is based on an iterative closest point method. First of all, the configuration of the 3D robot model is registered and synchronized with the robot in the actual environment. Next, with the help of a handheld camera, an existing three-dimensional reconstruction algorithm is run to obtain an environment model, wherein the environment model contains the actual robot. Then, four corresponding non-collinear point pairs are selected in the environment reconstruction model and the robot model, and a rough result of registration between the two models is obtained on the basis of an optimization algorithm. Finally, an iterative closest point algorithm is run to obtain a finer registration result. In this way, an environment reconstruction model based on a robot base coordinate system can be obtained by the rapid calibration method described above.

In addition, an existing three-dimensional reconstruction algorithm can be used to obtain a new object model in the actual environment. Then, a rapid calibration method similar to that described above can be used to add an object to the existing environment model, or remove an object from the environment model.

Figure 2:
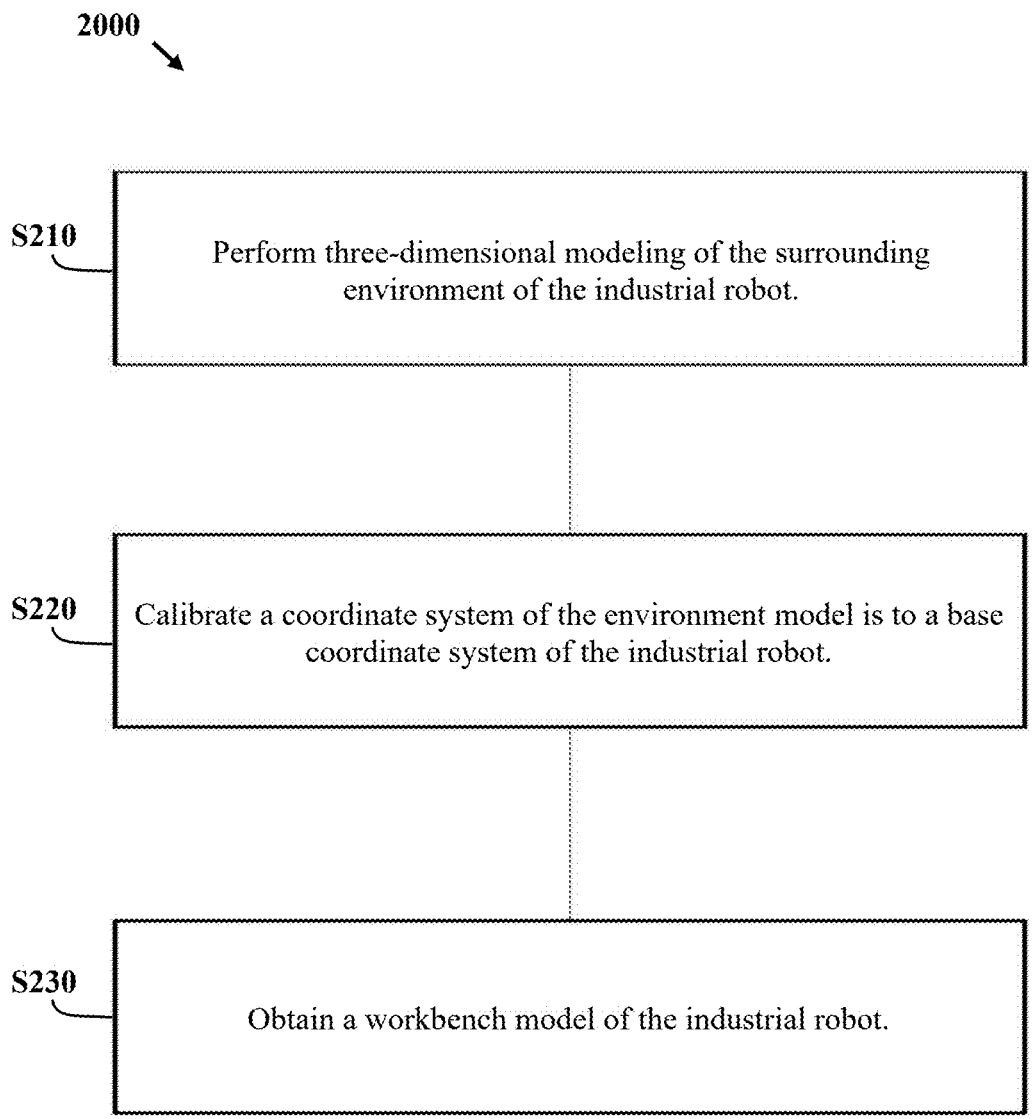
FIG. 2 shows a three-dimensional environment modeling method for an industrial robot according to an embodiment of the disclosure.

Referring to FIG. 2, FIG. 2 shows a three-dimensional environment modeling method 2000 for an industrial robot according to an embodiment of the disclosure.

In step S210, based on color and depth information of a surrounding environment of the industrial robot, three-dimensional modeling of the surrounding environment of the industrial robot is performed, so as to obtain an environment model.

In step S220, a coordinate system of the environment model is calibrated to a base coordinate system of the industrial robot.

In step S230, a workbench model of the industrial robot is obtained at least by performing grid cropping and filling of the calibrated environment model.

In the three-dimensional environment modeling method 2000, step S220 comprises: receiving a first model of the industrial robot, wherein the first model is synchronized with a pose state of the industrial robot located at a specific position in the actual environment; receiving the environment model, the environment model comprising a second model of the industrial robot; obtaining registration information of the second model, at least by selecting at least three corresponding non-collinear point pairs in the first model and the second model to perform registration; and based on the registration information, calibrating the coordinate system of the environment model to the base coordinate system of the industrial robot.

According to one or more embodiments of the disclosure, the fast 3D environment modeling and configuration method based on a 3D reconstruction algorithm according to the disclosure can be divided into three parts: 1) fast 3D environment reconstruction; 2) optimization of a 3D environment model; and 3) virtual environment configuration of a simulated workstation. Compared with the existing modeling solution based on three-dimensional geometric measurement, the solution of the disclosure is faster and more efficient, and does not require manual modeling and measurement of the size and position of each object. Moreover, the technical solution of the disclosure provides a standardized configuration method for all workbench objects (without the need for excessive manual intervention and design skills), so as to obtain the final three-dimensional workbench model.

In one embodiment, the color and depth information in step S210 can be acquired by an operator holding an RGB-D camera. In one embodiment, after step S220 and before step S230, although not shown, the three-dimensional environment modeling method 2000 may comprise: cropping the calibrated environment model according to a working space range of the industrial robot. The coordinate system of the environment model may be random, so the coordinate system of the environment model is calibrated to the base coordinate system of the robot. When cropping is performed, the calibrated environment model can be cropped according to the industrial robot's working space range. This can eliminate some redundant points in the environment model, to reduce the complexity of the model.

For example, the coordinate system of the environment model can be calibrated to the robot base coordinate system by an Iterative Closest Point (ICP) method. "Cropping" can consist of the following: based on a pre-defined working range of the industrial robot and calibrated robot coordinate system information, the environment model within the robot's working space range is segmented out, and at the same time the reconstructed robot model is removed according to the size range of the robot, to obtain an environment model in the robot's working space range that does not contain the robot model.

Those skilled in the art will understand that various iterative closest point (ICP) methods can be used, including but not limited to the precise registration method of point-to-plane search for nearest points proposed by Chen, Medioni and Bergevin et al., the fast registration method of point-to-projection search for nearby points proposed by Rusinkiewicz and Levoy, and the registration method of contractive-projection-point search for nearby points proposed by Soon-Yong and Murali, etc.

In one embodiment, after step S220 and before step S230, although not shown, the three-dimensional environment modeling method 2000 may comprise: using a grid degree-of-integration evaluation method to measure whether mapping of the calibrated environment model is complete. In one embodiment, the grid degree-of-integration evaluation method may comprise: firstly, according to the predefined robot working range and the robot coordinate system information calibrated in the previous step, segmenting out the reconstruction model in the robot's working space range, and at the same time removing the reconstructed robot model according to the size range of the robot, to obtain an environment model within the robot's working space range that does not contain the robot model; then segmenting the robot's working space into a certain number of subspaces according to a certain rule (such as sector segmentation), and sequentially displaying environment models in the subspaces; finally, sequentially determining whether the part in question is completely reconstructed.

In one embodiment, after step S220 and before step S230, although not shown, the three-dimensional environment modeling method 2000 may further comprise: evaluating the accuracy of the calibrated environment model after using a grid degree-of-integration evaluation method to measure whether mapping of the calibrated environment model is complete. In one embodiment, the evaluation of accuracy may comprise: first acquiring the true value of the relative distance between key objects in the robot's working space; then measuring the corresponding distance value in the reconstruction model, and obtaining a series of distance errors from |measurement value−true value|; finally, determining whether the maximum distance error is less than a preset threshold so as to determine whether the accuracy meets the requirements.

In one embodiment, performing grid cropping and filling of the environment model comprises: selecting an incomplete plane to be reconstructed; using the method of least squares to obtain parameters fitting the plane according to vertices on the plane; and establishing a new triangular face to replace the incomplete plane according to the parameters. In this way, the problem of incomplete reconstruction of transparent objects can be solved.

In addition, grid cropping and filling of the environment model can also be used to delete unnecessary reconstruction parts in the environment model. For example, the operator can subjectively select an unnecessary triangular face region, and then delete it.

In addition, grid cropping and filling of the environment model can also be used to add a working space boundary. In one embodiment, based on a predefined robot working space boundary model and the previously calibrated robot coordinate system information, the robot working space boundary model can be quickly added to the reconstructed environment model.

Finally, grid cropping and filling of the environment model can also be used to fill holes. In one embodiment, holes smaller than a boundary quantity threshold are sequentially selected according to a set boundary threshold. In order to prevent erroneous filling of a hole, the operator can also subjectively decide whether to fill the hole. The curvature of the triangular face used to fill the hole is then determined from the rate of change and information relating to curvature around the boundary of the hole.

In one embodiment, step S230 may specifically comprise: performing a grid simplification process after performing grid cropping and filling of the calibrated environment model; and after the grid simplification process, obtaining a workbench model of the industrial robot. In one embodiment, the grid simplification process may use an extraction algorithm (for example, a Quadric edge decimation algorithm); by setting a target number of faces or a target optimization percentage, a simplified environment model with a significantly reduced number of faces is finally obtained.

Figure 3:
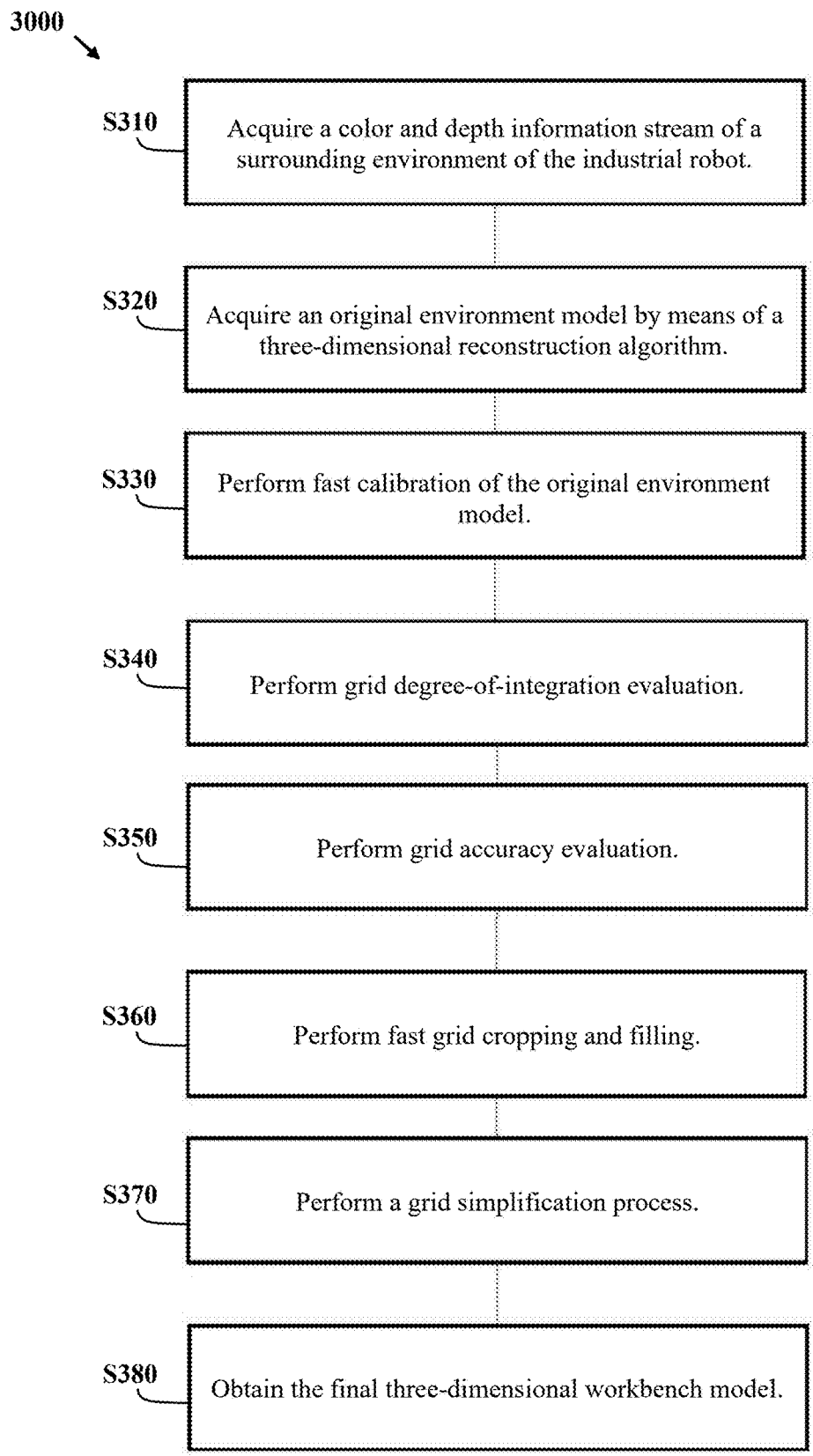
FIG. 3 shows a three-dimensional environment modeling method for an industrial robot according to another embodiment of the disclosure.

Referring to FIG. 3, FIG. 3 shows a three-dimensional environment modeling method 3000 for an industrial robot according to another embodiment of the disclosure.

In step S310, the operator acquires a color and depth information stream of a surrounding environment of the industrial robot by means of a handheld RGB-D depth camera.

In step S320, based on the color and depth information stream, an original environment model is acquired by means of a three-dimensional reconstruction algorithm.

In step S330, the original environment model undergoes fast calibration. The calibration method can be based on an iterative closest point method. For example, first of all, the configuration of the three-dimensional robot model is registered and synchronized with the robot in the actual environment. Next, with the help of a handheld camera, an existing three-dimensional reconstruction algorithm is run to obtain an environment model, wherein the environment model contains the actual robot. Four corresponding points are then selected in the environment reconstruction model and the robot model, and a rough result of registration between the two models is obtained on the basis of the optimization algorithm. Finally, an iterative closest point algorithm is run to obtain a finer registration result. In this way, an environment reconstruction model based on a robot base coordinate system can be obtained by the rapid calibration method described above.

In step S340, grid degree-of-integration evaluation is performed. In one embodiment, the grid degree-of-integration evaluation method may comprise: firstly, according to the predefined robot working range and the robot coordinate system information calibrated in the previous step, segmenting out the reconstruction model in the robot's working space range, and at the same time removing the reconstructed robot model according to the size range of the robot, to obtain an environment model within the robot's working space range that does not contain the robot model; then segmenting the robot's working space into a certain number of subspaces according to a certain rule (such as sector segmentation), and sequentially displaying environment models in the subspaces; finally, sequentially determining whether the part in question is completely reconstructed. By performing grid degree-of-integration evaluation, it is possible to measure whether mapping of the calibrated model is complete.

In one embodiment, if mapping of the calibrated model is incomplete, step S320 is executed again. If it is determined that the calibrated model is complete, step S350 is executed.

In step S350, grid accuracy evaluation is performed. In one embodiment, the evaluation of accuracy may comprise: first acquring the true value of the relative distance between key objects in the robot's working space; then measuring the corresponding distance value in the reconstruction model, and obtaining a series of distance errors from |measurement value−true value|; finally, determining whether the maximum distance error is less than a preset threshold so as to determine whether the accuracy meets the requirements. By performing grid accuracy evaluation, various accuracy parameters and methods can be used to measure whether the accuracy of the calibrated model meets the requirements of a three-dimensional workbench model.

In one embodiment, if the accuracy of the calibrated model does not meet the requirements, step S320 is executed again. If it is determined that the accuracy of the calibrated model meets the requirements, step S360 is executed.

In step S360, fast grid cropping and filling are performed.

In one embodiment, step S360 may comprise: firstly selecting an incompletely reconstructed plane, obtaining parameters fitting the plane according to vertices on the plane and the method of least squares, and then establishing a new triangular face according to the parameters to replace the original incomplete plane. In this way, the problem of incomplete reconstruction of transparent objects can be solved by performing fast grid cropping and filling.

In one embodiment, step S360 can also be used to delete unnecessary reconstruction parts. Specifically, the operator subjectively selects an unnecessary triangular face region, and then deletes it.

In an embodiment, step S360 can also be used to add a working space boundary. For example, based on a predefined robot working space boundary model and previously calibrated robot coordinate system information, the robot working space boundary model is quickly added to the reconstructed environment model.

In one embodiment, step S360 can also be used to fill holes. For example, according to a set boundary threshold, holes smaller than a boundary quantity threshold are selected sequentially, and in order to prevent erroneous filling of a hole, the operator subjectively decides whether to fill the hole; the curvature of the triangular face used to fill the hole is determined from the rate of change and information relating to curvature around the boundary of the hole.

In step S370, a grid simplification process is performed.

In one embodiment, the grid simplification process may use an extraction algorithm (for example, a Quadric edge decimation algorithm); by setting a target number of faces or a target optimization percentage, a simplified environment model with a significantly reduced number of faces is finally obtained.

In step S380, the final three-dimensional workbench model is obtained.

Although not shown in FIG. 3, after obtaining the 3D workbench model, if the external environment changes, object models can be quickly added to/deleted from the workbench model in the following way: first, an RGB-D camera is used to perform scanning/modelling of a newly added object and part of the surrounding environment, to obtain a new object model containing part of the surrounding environment; then, at least three non-collinear point pairs which correspond between the new object model and the workbench model are selected, and rough registration performed; finally, fine registration is performed by a method based on closest point iteration, and the model of the new object is finally added to the workbench model.

Figure 4:
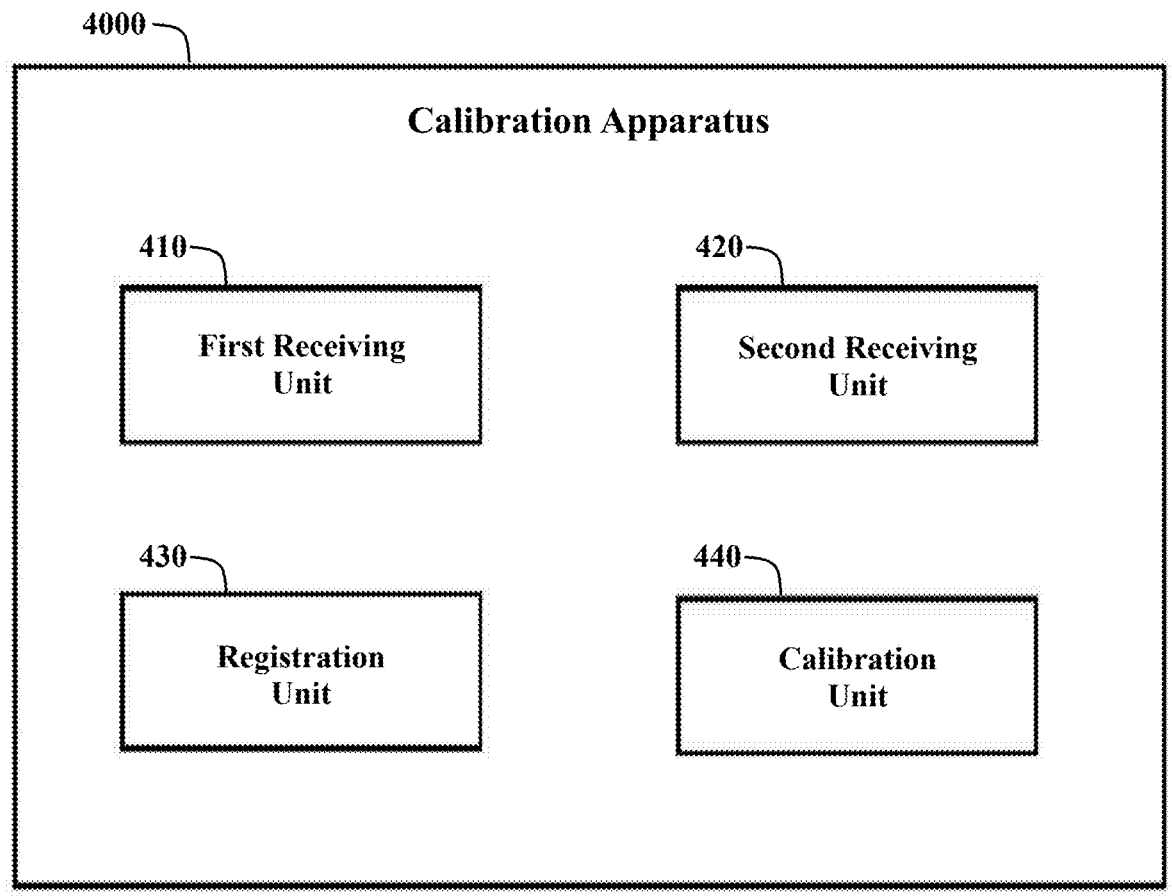
FIG. 4 shows a calibration apparatus for an industrial robot according to an embodiment of the disclosure.

FIG. 4 shows a calibration apparatus 4000 for an industrial robot according to an embodiment of the disclosure.

As shown in FIG. 4, the calibration apparatus 4000 comprises: a first receiving unit 410, a second receiving unit 420, a registration unit 430 and a calibration unit 440. The first receiving unit 410 is configured to receive a first model of the industrial robot, wherein the first model is synchronized with a pose state of the industrial robot located at a specific position in the actual environment. The second receiving unit 420 is configured to receive an environment model around the industrial robot, the environment model comprising a second model of the industrial robot. The registration unit 430 is configured to obtain registration information of the second model, at least by selecting at least three corresponding non-collinear point pairs in the first model and the second model to perform registration. The calibration unit 440 is configured to calibrate a coordinate system of the environment model to a base coordinate system of the industrial robot on the basis of the registration information.

In one embodiment, the registration unit 430 may further comprise: a first registration unit, for selecting four corresponding non-collinear point pairs in the first model and the second model to perform first registration; and a second registration unit, configured to perform second registration of the first model and the second model using an iterative closest point method, so as to obtain registration information of the second model.

Figure 5:
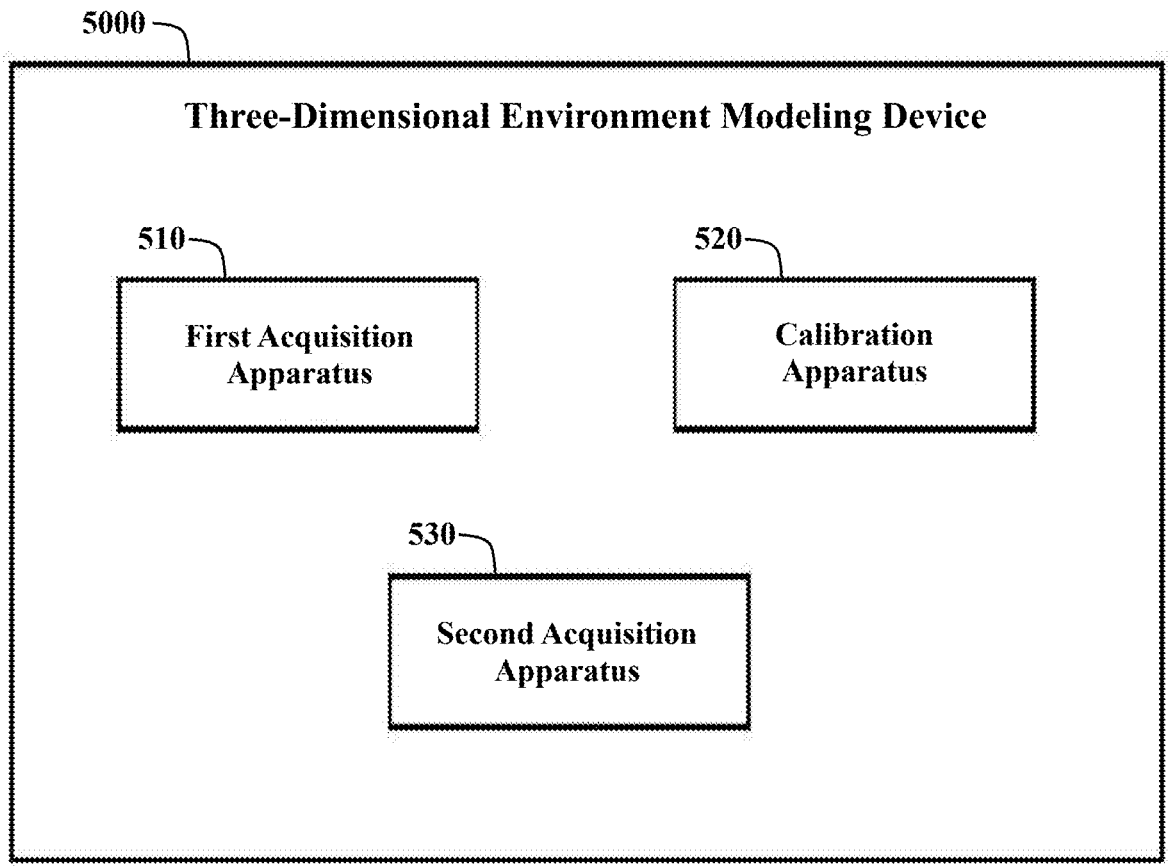
FIG. 5 shows a three-dimensional environment modeling device for an industrial robot according to an embodiment of the disclosure.

FIG. 5 shows a three-dimensional environment modeling device 5000 for an industrial robot according to an embodiment of the disclosure.

As shown in FIG. 5, the three-dimensional environment modeling device 5000 comprises: a first acquisition apparatus 510, a calibration apparatus 520 and a second acquisition apparatus 530. The first acquisition apparatus 510 is configured to perform three-dimensional modeling of a surrounding environment of the industrial robot on the basis of color and depth information of the surrounding environment of the industrial robot, so as to obtain an environment model. The calibration apparatus 520 is configured to calibrate a coordinate system of the environment model to a base coordinate system of the industrial robot. The second acquisition apparatus 530 is configured to obtain a workbench model of the industrial robot at least by performing grid cropping and filling of the calibrated environment model. In the three-dimensional environment modeling device 5000, although not shown, the calibration apparatus 520 further comprises: a first receiving unit, for receiving a first model of the industrial robot, wherein the first model is synchronized with a pose state of the industrial robot located at a specific position in the actual environment; a second receiving unit, for receiving the environment model, the environment model comprising a second model of the industrial robot; a registration unit, for obtaining registration information of the second model, at least by selecting at least three corresponding non-collinear point pairs in the first model and the second model to perform registration; and a calibration unit, for calibrating a coordinate system of the environment model to a base coordinate system of the industrial robot on the basis of the registration information.

In one embodiment, in the abovementioned three-dimensional environment modeling device 5000, the color and depth information is acquired by means of a handheld RGB-D camera.

In an embodiment, the three-dimensional environment modeling device 5000 may further comprise: a third acquisition apparatus and an adding/deleting apparatus. The third acquisition apparatus is used to obtain a model of a new object when the surrounding environment of the industrial robot changes. The adding/deleting apparatus is used for adding the model of the new object to the workbench model on the basis of an iterative closest point method. The adding/deleting apparatus can use principles and methods similar to those in the aforementioned robot calibration scheme. Specifically, the adding/deleting apparatus may be configured to select at least three non-collinear point pairs which correspond between the new object model and the workbench model, to perform rough registration. The adding/deleting apparatus then performs fine registration by a method based on closest point iteration, and finally adds the model of the new object to the workbench model.

Those skilled in the art will easily understand that the calibration method and/or the three-dimensional environment modeling method provided in one or more embodiments of the disclosure can be implemented via a computer program. For example, when a computer storage medium (such as a USB flash drive) storing the computer program is connected to a computer, the calibration method and/or the three-dimensional environment modeling method in an embodiment of the disclosure can be executed by running the computer program.

In summary, multiple embodiments of the disclosure provide a calibration solution and a three-dimensional environment modeling solution for an industrial robot. Although only some of the specific embodiments of the disclosure are described, those of ordinary skill in the art should understand that the disclosure can be implemented in many other forms without departing from the substance and scope of the disclosure, e.g. implemented on an industrial robot operating platform. Therefore, the examples and embodiments shown are regarded as illustrative rather than restrictive. The disclosure may cover various modifications and substitutions without departing from the spirit and scope of the disclosure as defined by the appended claims.

The invention claimed is:

1. A calibration method for an industrial robot, comprising:
receiving a first model of the industrial robot, wherein the first model is synchronized with a pose state of the industrial robot located at a specific position in an actual environment;
receiving an environment model around the industrial robot, the environment model comprising a second model of the industrial robot;
obtaining registration information of the second model, at least by selecting at least three corresponding non-collinear point pairs in the first model and the second model to perform registration; and
based on the registration information, calibrating a coordinate system of the environment model to a base coordinate system of the industrial robot,
wherein the calibration method is performed by a calibration apparatus of a three-dimensional environment modeling device configured to (i) perform three-dimensional modeling of a surrounding environment of the industrial robot, based on color and depth information of the surrounding environment of the industrial robot, so as to obtain the environment model, and (ii) obtain a workbench model of the industrial robot at least by performing grid cropping and filling of the calibrated environment model.

2. The calibration method as claimed in claim 1, wherein obtaining registration information of the second model, at least by selecting at least three corresponding non-collinear point pairs in the first model and the second model to perform registration, comprises:
   selecting four corresponding non-collinear point pairs in the first model and the second model to perform first registration; and
   using an iterative closest point method to perform second registration of the first model and the second model, so as to obtain registration information of the second model.

3. The calibration method as claimed in claim 1, wherein the environment model around the industrial robot is acquired by (i) using a handheld RGB-D camera to acquire color and depth information of a surrounding environment of the industrial robot, and (ii) based on the color and depth information, performing three-dimensional modeling of the surrounding environment of the industrial robot, so as to acquire the environment model.

4. A three-dimensional environment modeling method for an industrial robot, comprising:
   based on color and depth information of a surrounding environment of the industrial robot, performing three-dimensional modeling of the surrounding environment of the industrial robot, so as to obtain an environment model;
   calibrating a coordinate system of the environment model to a base coordinate system of the industrial robot; and
   obtaining a workbench model of the industrial robot, at least by performing grid cropping and filling of the calibrated environment model,
   wherein the calibrating the coordinate system of the environment model to the base coordinate system of the industrial robot comprises:
      receiving a first model of the industrial robot, wherein the first model is synchronized with a pose state of the industrial robot located at a specific position in an actual environment;
      receiving the environment model, the environment model comprising a second model of the industrial robot;
      obtaining registration information of the second model, at least by selecting at least three corresponding non-collinear point pairs in the first model and the second model to perform registration; and
      based on the registration information, calibrating the coordinate system of the environment model to the base coordinate system of the industrial robot.

5. The three-dimensional environment modeling method as claimed in claim 4, wherein the color and depth information is acquired by a handheld RGB-D camera.

6. The three-dimensional environment modeling method as claimed in claim 4, further comprising:
   after the coordinate system of the environment model is calibrated to the base coordinate system of the industrial robot, cropping the calibrated environment model according to a working space range of the industrial robot.

7. The three-dimensional environment modeling method as claimed in claim 4, further comprising:
   after the coordinate system of the environment model is calibrated to the base coordinate system of the industrial robot, using a grid degree-of-integration evaluation method to measure whether mapping of the calibrated environment model is complete.

8. The three-dimensional environment modeling method as claimed in claim 7, further comprising:
   after a grid degree-of-integration evaluation method is used to measure whether mapping of the calibrated environment model is complete, evaluating an accuracy of the calibrated environment model.

9. The three-dimensional environment modeling method as claimed in claim 4, wherein the grid cropping and filling comprises:
   selecting an incomplete plane to be reconstructed;
   using a method of least squares to obtain a parameter fitting the incomplete plane, according to a vertex on the incomplete plane; and
   establishing a new triangular face to replace the incomplete plane according to the parameter.

10. The three-dimensional environment modeling method as claimed in claim 4, wherein the grid cropping and filling comprises:
   adding a robot working space boundary model to the calibrated environment model.

11. The three-dimensional environment modeling method as claimed in claim 4, wherein the grid cropping and filling comprises:
   according to a set boundary threshold, sequentially selecting holes smaller than the boundary threshold; and
   based on a rate of change and information relating to curvature around a boundary of the selected hole, determining a curvature of a triangular face used to fill the selected hole.

12. The three-dimensional environment modeling method as claimed in claim 4, wherein the obtaining the workbench model of the industrial robot, at least by performing grid cropping and filling of the calibrated environment model, comprises:
   performing a grid simplification process after performing grid cropping and filling of the calibrated environment model; and
   after the grid simplification process, obtaining the workbench model of the industrial robot.

13. The three-dimensional environment modeling method as claimed in claim 12, wherein the grid simplification process comprises:
   determining a target number of faces or a target optimization percentage; and
   using an extraction algorithm to obtain the determined number of faces.

14. The three-dimensional environment modeling method as claimed in claim 4, further comprising:
   obtaining a model of a new object when the surrounding environment of the industrial robot changes; and
   adding the model of the new object to the workbench model based on an iterative closest point method.

15. A three-dimensional environment modeling device for an industrial robot, the device comprising:
   a processor configured to execute a computer program to:
      perform three-dimensional modeling of a surrounding environment of the industrial robot, based on color and depth information of the surrounding environment of the industrial robot, so as to obtain an environment model;
      calibrate a coordinate system of the environment model to a base coordinate system of the industrial robot by:

receiving a first model of the industrial robot, wherein the first model is synchronized with a pose state of the industrial robot located at a specific position in an actual environment;

receiving the environment model, the environment model comprising a second model of the industrial robot;

obtaining registration information of the second model, at least by selecting at least three corresponding non-collinear point pairs in the first model and the second model to perform registration; and calibrating the coordinate system of the environment model to the base coordinate system of the industrial robot based on the registration information; and obtain a workbench model of the industrial robot at least by performing grid cropping and filling of the calibrated environment model.

16. The three-dimensional environment modeling device as claimed in claim 15, wherein the color and depth information is acquired by a handheld RGB-D camera.

17. The three-dimensional environment modeling device as claimed in claim 15, the processor further configured to execute the computer program to:

obtain a model of a new object when the surrounding environment of the industrial robot changes; and add the model of the new object to the workbench model based on an iterative closest point method.

18. The three-dimensional environment modeling method as claimed in claim 4, wherein obtaining registration information of the second model further comprises:

selecting four corresponding non-collinear point pairs in the first model and the second model to perform first registration; and using an iterative closest point method to perform second registration of the first model and the second model, so as to obtain registration information of the second model.

19. The three-dimensional environment modeling device as claimed in claim 15, wherein the processor obtains the registration information of the second model by:

selecting four corresponding non-collinear point pairs in the first model and the second model to perform first registration; and using an iterative closest point method to perform second registration of the first model and the second model, so as to obtain registration information of the second model.

* * * * *